Feb. 26, 1935.   J. B. WANTZ   1,992,894
VERTICAL STEREORADIOGRAPHIC APPARATUS
Filed Sept. 20, 1926    4 Sheets-Sheet 1

Inventor:
Julius B. Wantz

Feb. 26, 1935.  J. B. WANTZ  1,992,894
VERTICAL STEREORADIOGRAPHIC APPARATUS
Filed Sept. 20, 1926   4 Sheets-Sheet 4

Patented Feb. 26, 1935

1,992,894

UNITED STATES PATENT OFFICE 1,992,894

VERTICAL STEREO-RADIOGRAPHIC APPARATUS

Julius B. Wantz, Oak Park, Ill., assignor to General Electric X-Ray Corporation, Chicago, Ill., a corporation of New York Application September 20, 1926, Serial No. 136,506

21 Claims. (Cl. 250—34)

The present invention relates to an instrumentality particularly adapted for use with X-ray apparatus, and has to do with an improved means for making stereoscopic views. The invention resides not only in the specific structure disclosed, but also in the general arrangement of the elements of the apparatus whereby an improved means for procuring stereoscopic views is supplied.

Among the objects of the invention are included the following:

An improved instrumentality for facilitating the production of stereoscopic radiographs;

The combination with a shiftable cassette holder of a tube stand particularly adapted to be automatically adjusted to provide a difference in the position of focal points essential to proper stereoscopic photography;

An improved tube holding apparatus adapting itself to ready shifting of a predetermined degree whereby as an incident to the making of stereoscopic views the focal point of the tube may be automatically shifted a predetermined distance;

The combination with a plate holder and a tube support of cooperating scales whereby proper focusing therebetween is made a relatively simple expedient and can be accomplished with precision;

An unique arrangement of scales upon a tube holder and upon a plate holder whereby the two may be made to cooperate for the purpose of expediting the focusing of an X-ray tube in said support and facilitating an accurate shifting of the focal point of such tube;

An unique tube supporting member adapted to be moved automatically from one position to another, the movement being of a predetermined distance;

An improved stand for an X-ray tube permitting of the automatic shifting of the tube and combining therewith brake means to prevent jars and vibration;

The combination with an X-ray tube of an adjustable member having means for facilitating the focusing of the rays from such tube upon a plate holder and having means for shifting the tube a predetermined distance with relatively slight jar.

These, and such other objects as may hereinafter appear, are obtained by the novel construction, combination, and arrangement of the parts of the device, one form of which is shown in the accompanying two sheets of drawings, in which.

Like reference characters are used to designate similar parts in the drawings and in the description which follows.

Figures 1, 8:
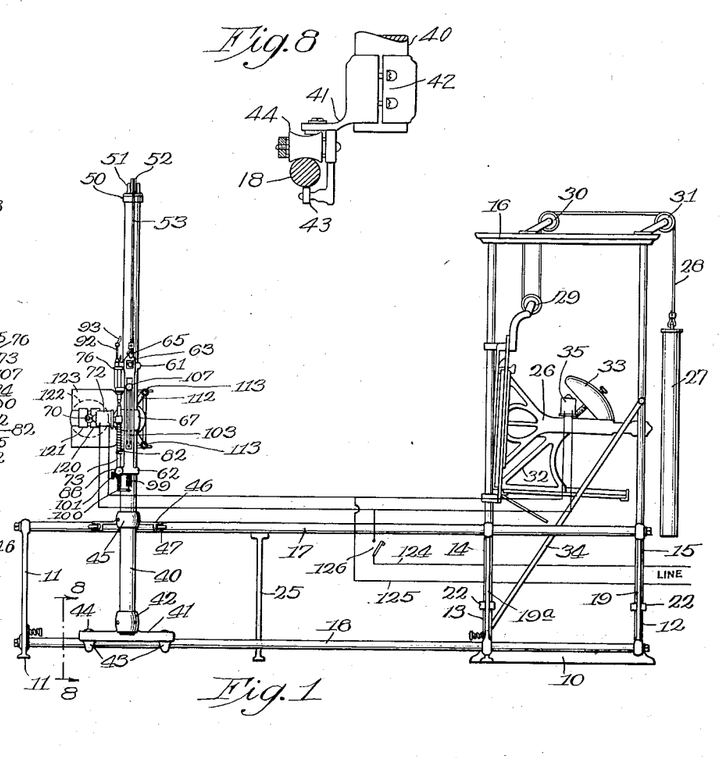
Figure 1 is a side elevation of a plate holder and vertical tube holder.
Figure 8 is an end elevation of the carriage supporting the standard shown in Figure 1, the view being on the line 8—8 of said figure and looking in the direction of the arrows.
Figure 2:
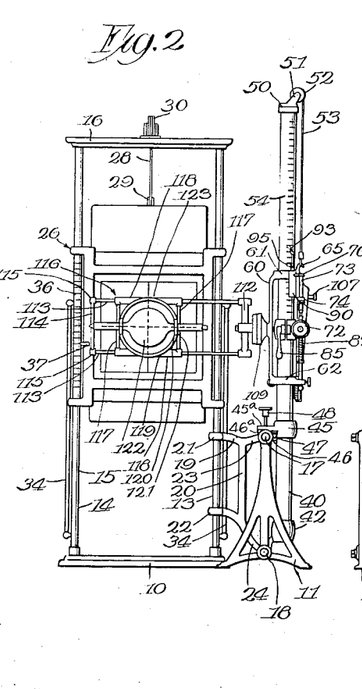
Figure 2 is a front view thereof.

The plate shifter and the tube holding device may be disposed upon a connecting frame. When so constructed, a frame such as is shown in Figure 1 and 2 is applicable.

The structure of the plate shifter comprises a large base member, generally an H-shaped casting, and designated 10 in the drawings. The H-shaped member is employed upon the plate shifter only, the plate shifter supporting the connecting frame. Said connecting frame has a member 11 at one end which supports the connecting frame members and engages the floor as a support therefor. The member 11 is triangular in shape, the base of the triangle comprising the feet adapted to rest upon the floor.

Projecting upwardly from the base 10 of the plate shifter are uprights 12, 13, 14 and 15. Upright 14 is back of standard 13 in Figure 1, and standard 15 is back of standard 12 in said figure, standard 14 being plainly visible in Figure 2.

Standards 12, 13, 14 and 15 are held in alignment by a generally square casting with a central aperture hereinafter called top member 16 and plainly shown in both Figures 1 and 2.

At one side of the plate shifter and extending to the member 11 is a track comprising an upper rail 17 and a lower rail 18, these being heretofore designated connecting frame members. The lower rail 18 is disposed between the feet of end member 11 and said rail 18 and rail 17 extend to points adjacent the upright 12. These rails (17 and 18) are held securely by two bracket members 19 and 19a shown in Figures 1 and 2. Bracket 19a differs from bracket 19 only in the addition thereto of a foot and a spring cushion, and in that bracket 19 is affixed to the upright 12 and bracket 19a is secured to the upright, 13.

For bracing the uprights 12, 13, 14 and 15, members 34 are supplied intermediate the uprights 12 and 13, and the uprights 14 and 15.

Said bracket members 19 and 19a comprise a body portion 20, arms 21 and 22 which engage the uprights 12 and 13, and arms 23 and 24 which engage, respectively, rails 17 and 18. Other forms for these brackets could readily be devised and would serve the same purpose equally well. As indicated above, the arm 24 on bracket 19a continues downwardly surrounding the rail 18 to provide a foot or support.

Intermediate the rails 17 and 18 is a spacing element 25, best shown in Figure 1, and which, because of the foot thereon, provides means for reinforcing the two rail members 17 and 18, and prevents sagging as well as keeping them in alignment. Notwithstanding that said bracket has a foot, and engages the rails, 17 and 18, it is so arranged that it does not interfere with the movement along said rails of the vertical stereoscopic unit shortly to be discussed.

The plate shifter comprises, generally, in addition to the parts already described, a carriage 26 adapted to reciprocate on standards 12, 13, 14 and 15, and having a counterbalance 27. The counterbalance 27 is upon the end of a cord 28 anchored to casting 16 and passing around pulleys 29, 30 and 31 to provide for the free but counterpoised movement of the carriage 26. Pulleys 30 and 31 are attached to castings 16 and pulley 29 to carriage 26.

Mounted upon a shifting pivot in the carriage 26 is a plate holder having plate holding sections at right angles to one another, such plate holder being designated generally by the numeral 32. The plateholder 32 is counterpoised by an adjustable weight 33. This entire mechanism is the subject of another application for patent, Serial No. 20,885 filed April 4, 1925, under the name of the inventor here, Julius B. Wantz, which has matured into Letters Patent numbered 1,788,178 and issued January 6, 1931.

A more complete description of the divers parts of the plate shifting apparatus is not believed to be in order here. It seems only necessary to show that it provides a means for quickly shifting a number of light sensitive papers, films or plates to expose one in the cassette, and when this has been done, to bring the second into position for exposure.

It is proper to add, however, that the cassette holding member just described is adapted to be loaded with paper, plates or films contained in two cassettes as is usual in the art. When said holder is placed in a position shown in Figure 1, one cassette is ready for exposure, and when an exposure has been made, the release 35 is actuated, which allows the cassette holder 32 to change its position, the lower cassette holding section moving upwardly into position for exposure, and the upper cassette holding section moving into a horizontal position free from the possibility of further exposure. The movements are accomplished upon a shifting pivot supporting holder 32, the details of which are described in the previously filed application. The action just described of the cassette holder is rapid, and there is very slight or no vibration to produce distortion of an image upon a sensitized object contained in the cassette in the lower cassette holding section. All of these matters are dealt with in greater detail in the co-pending patent application above described.

Upon standard 14 is a scale 36, shown in Figure 2, the figures on which are adapted to register or correspond with a scale upon the tube holding member soon to be described. A pointer or indicator 37, (generally an arrow), is situated upon carriage 26 in juxtaposition to scale 36 and reciprocates with said carriage. The position of carriage 26 upon standards 12, 13, 14 and 15 is thus indicated upon scale 36, and an adjustment of the tube holding portion may be made in accordance with the reading upon said scale 36 produced by arrow 37.

Reference will now be had to the tube holding or tube carrying mechanism. This comprises, generally, a standard 40 having a lower carriage 41 provided with collar 42, provided with a flange secured to said carriage 41. Said collar is adapted to encircle the standard 40 and provides means for attaching the carriage 41 and the standard 40 rigidly together.

The carriage 41 comprises a body having upper and lower guide bearings or rollers 44 and 43, respectively. The rollers 43 and 44, are adapted to engage the rail 18 to provide support and to prevent lateral or vertical movements of the standard 40. The upper V-shaped rollers 44 provide for the standard 40 its principal support and prevent its lateral movement while the lower rollers 43 prevent accidental disengagements of the rollers 44, from the rail 18.

A second carriage 45 is provided for the standard 40 adjacent the top rail 17. The upper carriage 45 comprises bifurcated arms at each side of the collar, portions thereof surrounding standard 40, the outer arm 46 having larger bearings than the inner arm 46a. These members prevent lateral movement of the standard 40 and are so disposed that they do not impinge upon the brace member 25. They pass over without difficulty. The rollers on carriage 45 in arms 46 and 46a have vertical axes and therefore rotate in a horizontal plane.

In addition, there is upon the carriage portion 45 a screw locking member 45a which extends through a flange projecting from the collar 45 and over the top of rail 17.

The arrangement such as is here described provides a movable support for the standard 40 and permits of such standard being moved back and forth upon the rails 17 and 18, the limit of movement being restricted on one end by the member 11 and at the other end by the member 19a. Upon the member 11, a spring cushion such as is provided upon member 19a may be supplied.

The screw locking member 45a provides a braking member having an operating handle 48 shown in Figure 2. This may comprise, as shown, the ordinary screw lock, the screw having a shank the end of which is against the rail 17 to secure the standard 40 disposed upon the carriages 41 and 45 against longitudinal movement along the rails 17 and 18.

The standard 40 is hollow. At its top is provided a collar 50 having a bracket 51 supporting a pulley 52. Over the pulley 52 a cable 53 is drawn. One end of the cable 53 is secured to a weight (not shown) adapted to reciprocate within the standard 40 and the other end of cable 53 is secured to an X-ray tube carrying member, shortly to be described. An accurate counterpoise for the tube carrying member last mentioned is thus obtainable.

The angle of the bracket 51 is such that one portion of the cable 53 is substantially vertical intermediate the pulley 52 and the tube-supporting member, and the other portion is also vertical intermediate the cable 52 and weight within the cylinder.

Upon the standard 40 is a scale plainly visible in Figure 2. This scale is designated 54 and it corresponds with the scale 36 upon the cassette changer. The entire apparatus should be so disposed upon a level floor or surface that the corresponding numerals upon the scales 36 and 54 are precisely the same distance above floor level.

Figure 3:
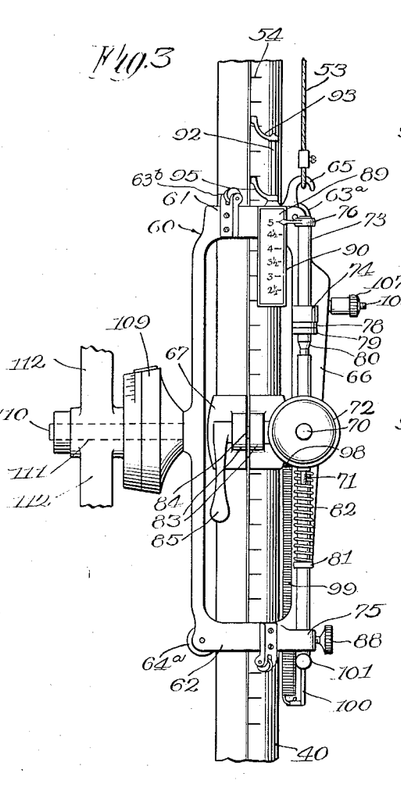
Figure 3 is an enlarged fragmentary side view of the tube holder.
Figures 4, 5, 6, 7:
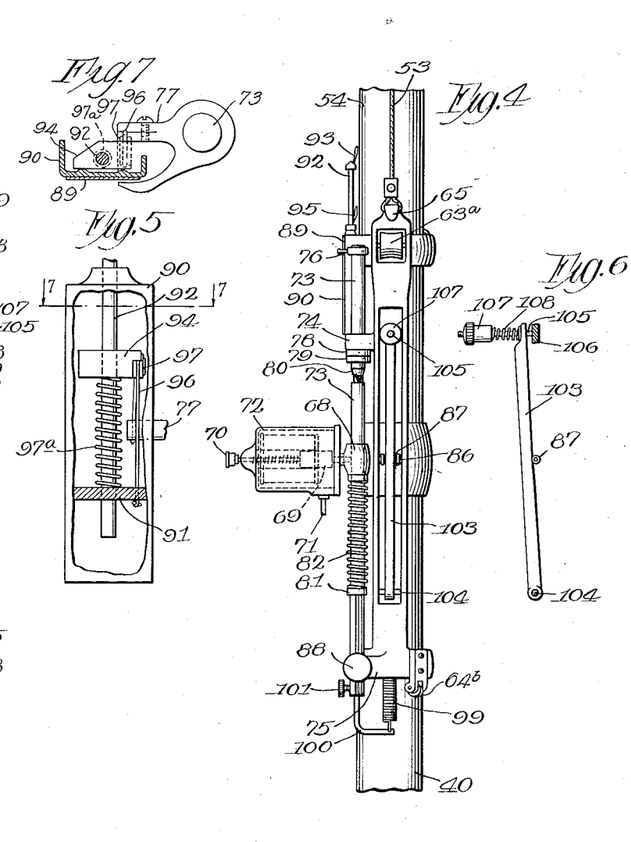
Figure 4 is an enlarged view of so much of the device as is shown in Figure 3, but at right angles thereto.
Figure 5 is a detail, partly in section, of the indicator adjusting mechanism.
Figure 6 is a detail of the brake mechanism showing the manner in which it is operated and adjusted, the associated parts being removed.
Figure 7 is a transverse cross section on line 7—7 of Figure 5, looking in the direction of the arrows.
Figure 9:
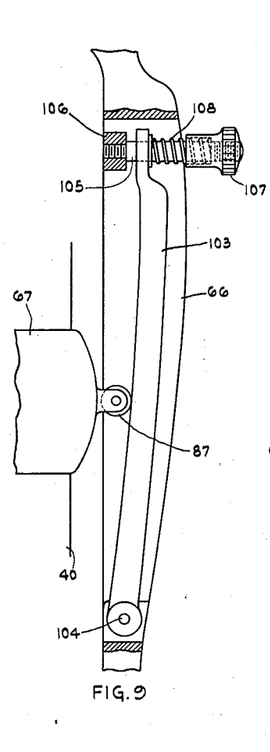
Figure 9 is a fragmentary vertical section illustrating the position of the braking parts for obtaining a two and one-half inch shift.
Figure 10:
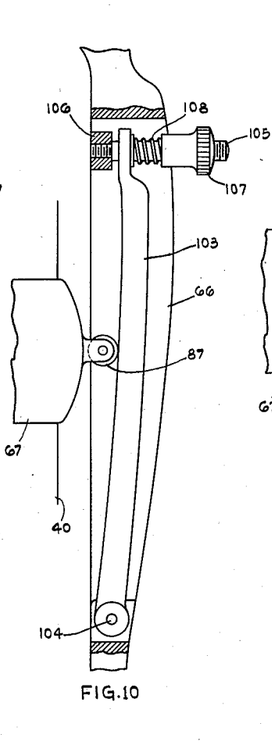
Figures 10, 11 and 12 illustrate the same parts for shifts of different lengths, the last named figure disclosing the setting of the parts for a five inch shift.
Figure 11:
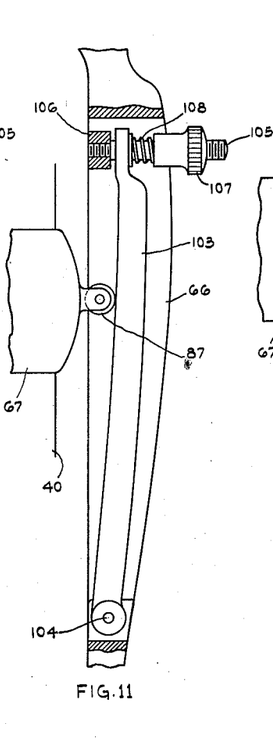
Figure 12:
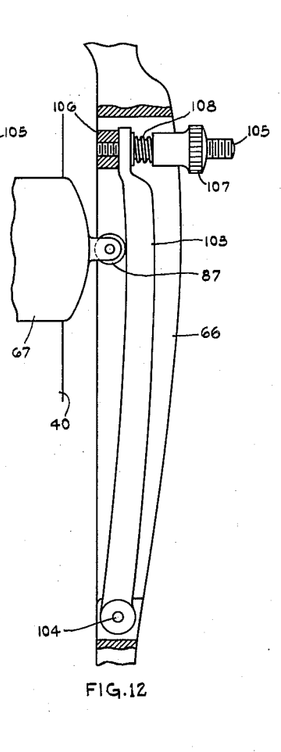
Figures 13, 14, 15, 16:
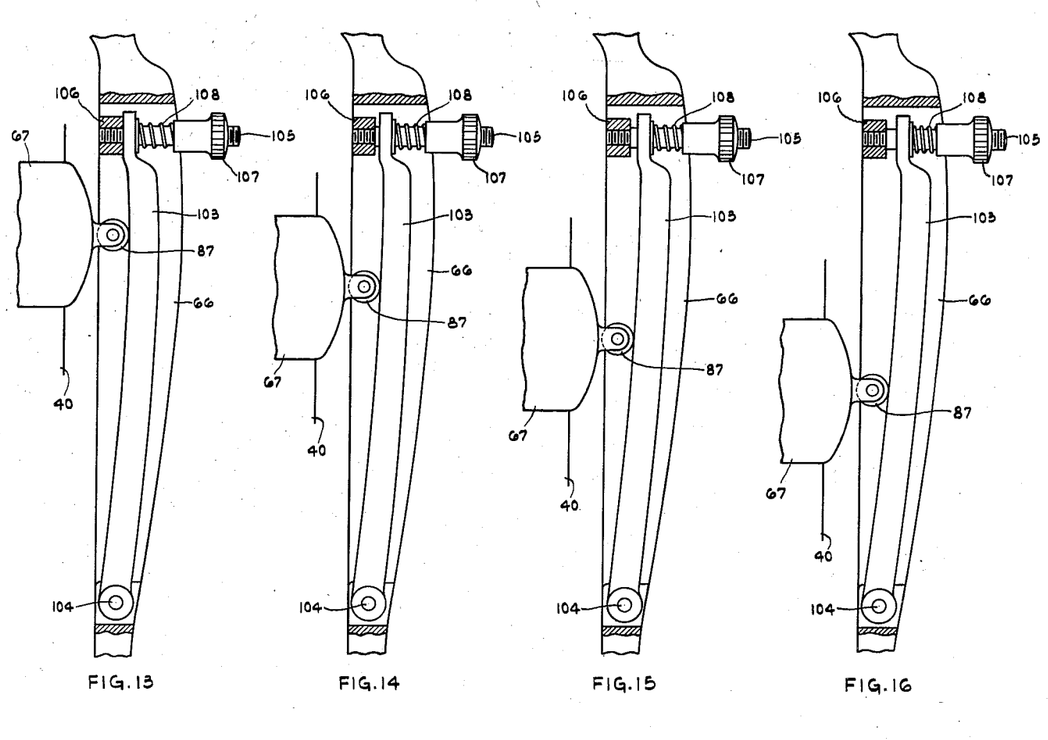
Figures 13, 14, 15 and 16 each disclose the relative position of the several braking parts during a five inch shift of the X-ray tube holder, Figure 12 being a counterpart of Figure 13.

A carriage 60, best shown in Figure 3, in the form of an elongated O-shaped casting comprises the main support for the X-ray tube carrying part. Carriage 60 has collars at its top and bottom encircling standard 40 and two side members are integral with and between the collars. This portion of the device is clearly shown in Figures 3 and 4, the tube supporting parts being better shown in Figure 2.

This casting is designated 60 and includes, as stated, collars 61 and 62. Collar 61 surrounds the standard 40 at the top of carriage 60 and is provided with one or more bearings. Said upper collar 61 preferably has one large bearing 63a at its outer side and two smaller bearings 63b at its inner side, the several bearings being spaced approximately 120 degrees apart.

Collar 62 is provided with one or more bearings, the larger of which 64a is disposed upon the inner side thereof, and the two smaller 64b at the outer side of standard 40. The bearings 64a and 64b also are placed 120 degrees apart.

By disposing the bearings in the manner indicated, the weight of the tube, the tube enclosing portion, and the tube carrying parts, is correctly disposed upon the standard 40 to provide for free movement of carriage 60 therealong, the impinging portion of the carriage 60 being provided with the large roller bearings 63a and 64a to prevent friction, and smaller bearings 63b and 64b to serve as guide members.

A hook member 65 is provided upon collar portion 61 to receive one end of cable 53, which may be looped or provided with an eyelet.

The slidable carriage 60 at one side includes a slotted part, formed as an incident to casting, the material adjacent said slotted part being of greater width as the top of the carriage is approached as is shown in Figure 3. Between these sides and in the slot is disposed a braking member, most clearly shown in Figure 6 and later to be described.

The carriage 60 is arranged to be moved between exposures of the light sensitive films or plates in the cassette holder. The movement of the carriage 60 is necessarily between well defined boundaries and from one predetermined point to another. The whole purpose of the device is to provide a perfected means for obtaining improved stereoscopic views. An anchoring means must be provided for carriage 60, and its movements must be in relation thereto.

A member 67 comprising a split ring disposed about standard 40 provides the necessary anchor for carriage 60. The association between member 67 and carriage 60, while flexible, is sufficiently rigid when the carriage is locked in its normal positions to permit of the carriage 60 being accurately adjusted with respect to the cassette holder. The adjustment is preferably made when the carriage 60 is in its normal position.

In order to avoid the effects of inertia developed by gravity, the carriage 60 is preferably made to operate with an upward movement from its set position to its normal position. The movement is spring actuated and adjustable arresting means are provided as well as are means for determining in advance the displacement upwardly of the carriage 60. This displacement in practice is between two and one-half and five inches.

Upon the split ring member 67 is an apertured lug 68. Adjacent this lug 68 and rigidly secured to member 67 is a release or trip 69, adapted to be manually or electrically operated. A button 70 is shown for manual actuation while the cords 71 provide for electrical connection to obtain electrical actuation. The trip 69 may be enclosed in a housing 72, and it should be urged inwardly of lug 68 at all times to engage rod 73 adapted to slide freely in the aperture in said lug 68.

Upon the outside of carriage 60 are two apertured bosses 74 and 75. Through these the rod member 73 may be slidably adjusted. Said rod member 73 comprises at its top a pointer 76 and an arm 77 to which a small cable is secured.

Adjacent its end is a collar 78 secured thereto by friction holding means and against this collar and at the under side thereof is a rubber cushion 79. Beneath the cushion 79 the rod 73 is cut away to form a peripheral shoulder 80.

Adjacent its lower end is a second ring collar 81 held on rod 73 by friction. A coil spring 82 is disposed on the upper side of said collar 81 and extends upwardly to engage the projecting boss 68 secured to the split ring member 67.

The split ring member 67 has at its open portion outwardly projecting flanges 83. Through these outwardly projecting portions 83 a screw clamping member 84 adapted to be operated by a handle 85 is provided. The handle member 85 when actuated causes the split ring 67 to firmly or loosely grip the standard 40 as desired.

At one side of the split ring member 67 is a projecting bracket 86 carrying a roller bearing 87, the purpose of which will later be apparent.

The arrangement described is such that a track having cushioned ends is provided for the tube carrying portion. A coil spring 82 is disposed intermediate the locking ring and the carriage. This in combination with the cushion members supplied gives the necessary elasticity to the connection between the split ring member 67 and the carriage 60 to prevent shock to the apparatus disposed upon carriage 60 when brought to a sudden stop when moved in either direction or when shifted about in the course of operation.

The rod 73 is adapted to be adjusted within the two apertured bosses 74 and 75 in the carriage 60 and a thumb screw 88 for this purpose of fixing the adjustments made is disposed in boss 75, the boss in the lower collar 62 of the carriage 60.

The pointer 76 on rod 73 heretofore described is readable against a scale 89 secured to the upper collar 61. Said scale 89 comprises a scale front, a frame 90, and a transverse member 91. A rod 92 carrying a pointer 93 readable upon scale 54 on standard 40 is adapted to reciprocate in apertures in said frame 90 and said transverse member 91. On said rod 92, and intermediate the frame 90 and transverse member 91 is a block 94.

It will be noted that the scale 89 at its top has a second pointer 95, which is stationary and which is readable against the scale 54 on standard 40 just as is movable pointer 93 last referred to.

Within the frame 90 for the scale 89, the rod 92 carrying the movable pointer 93 reciprocates, movement of said rod 92 being brought about through a cable 96, heretofore referred to as attached at one end to member 77.

Said cable 96 which is moved each time rod 73 is adjusted passes upwardly over a pulley 97 in block 94 on rod 92 and is anchored at its lower end in transverse member 91. The magnitude of the movement of pointer 93 consequently equals one half the magnitude of any adjusting movement of rod 73. Between the bearing block 94 and the lower transverse member 91 is a coil spring 97a which surrounds the rod 92 carrying the movable pointer 93.

Upon the split ring 67 is a button 98. A coil spring 99 is secured to button 98 and extends downwardly. The lower end of spring 99 is secured to an L-shaped member 100, the upright portion of which extends upwardly in a centrally disposed hole in the rod 73. A thumb nut 101 is provided in said rod for holding said L-shaped member 100 in any adjusted relation to rod 73. The spring 99 is the actuating means whereby the carriage 60 is pulled upwardly from its set position to its upper or normal position. The manner of operation will now be disclosed.

For the purpose of illustrating how very practical and simple the operation of the carriage 60 is, an explanation of the procedure as for radiographs of the chest will perhaps serve best. A patient is placed before the balanced cassette changer, the front panel of which is centered to the patient, as usual. The operator then observes the reading on the scale 36 at the rear of the cassette changer, which reading indicates the height at which the tube carried by carriage 60 must be placed on the tube standard 40 to be in the exact center to the film.

No measuring is required, so that the settings will require but a few seconds. The scale 89 provided for the tube shifting measurement, the setting of which is within the range of two and one-half inches to five inches, is according to the distance of tube shift desired. This distance depends upon the distance between the tube and the film. The setting of the shift at the directed distance between two and one-half and five inches should be made before adjusting the tube carriage 60 in accordance with the readings on the cassette changer.

An operator needs only to refer to a chart which is supplied to him by the manufacturer of the device to determine the setting for the tube shift, this depending as has been indicated, upon the distance between the tube and the film. No time-consuming calculations are necessary on the part of the operator.

Obviously, these settings must be correct to insure true stereoscopic effect, and being certain because charted, it is necessary, only to measure the distance between the tube and the film before centering the tube holding apparatus carriage 60. The pointer 76 is next moved to the proper position with respect to the scale 89. Thumb screw 88 on rod 73 is loosened to provide for the adjustment of pointer 76 and is tightened when the adjustment is made.

When the adjustments referred to have been made, the carriage 60 is pulled downwardly until the trigger 69 is seated on the shoulder 80. This movement is against the tension of spring 99, which is thus extended and which stands ready to draw the carriage 60 upwardly into its uppermost or normal position. The tension upon the spring 99 is regulated through the member 100, the adjustment of which when fixed is secured by thumb screw 101.

The height reading taken from the scale 36 is obtained upon the tube standard 40 by placing pointer 93 against the scale 54 and is direct, that is, the setting is correct without any further calculating as has heretofore been necessary when compensating for the tube shift from focal center. The adjustment is made with the carriage in its "set" position, that is, with tension upon the carriage shift spring 99.

With the release of trigger 69 the carriage 60 moves upwardly under the urging influence of the spring 99 until its uppermost or normal position is approached. Then under the influence of the spring 82 upon the rod 73, its motion is arrested.

In order that the upward movement may be regulated to a nicety so that there will be no jar incident to the shifting of tube positions, a braking member is supplied. It has already been pointed out that two flanged portions 66 are arranged upon the carriage 60 about a slot.

In the slot referred to is disposed a brake beam 103, said member being pivoted at 104. At its top member 103 is adapted to impinge a coil spring 108 intermediate the end of member 103 and nut 107. Turning inwardly or outwardly said nut 107 increases or decreases the tension upon spring 108 and offers more or less resistance to the outward movement at its top end of member 103.

The member 103 upon its longitudinal inside surface engages the roller 87 upon the split ring 67. The tension upon spring 108 therefore determines the resistance to the upward movement of carriage 60 when released under spring tension, and permits of a very fine adjustment in order that the carriage 60 may be at the termination of the impulse of spring 99 when said carriage reaches its normal position. When properly adjusted, it reaches the normal position without a jar.

Figures 9 to 16 illustrate clearly the operation of the brake member through which a variable shift is obtained.

In Figures 9, 10, 11 and 13, the positions of the several parts just described for obtaining shifts varying from two and one-half inches to five inches are shown. It will be noted that the spring 108 is under the least tension for the shortest shift because the impetus of the spring actuating the tube carriage is less for this distance than for greater distances of shift.

The end of the movement of the carriage, in each instance, is substantially in the same position in respect to the brake beam 103 and the roller 87.

Figures 13, 14, 15 and 16 illustrate the movements of the several brake parts during a shift of five inches. It will be noted that the beam 103 is forced outwardly as the carriage travels upwardly relatively to the stationary part 67 on which the roller bearing 87 is disposed. By adjusting the spring 108 movement is arrested at a fixed point, i. e., the end of the shift. The tension upon the spring being suitably adjusted, the carriage upon release of the trigger will move a selected distance, the movement for which adjustment is made being indicated upon the scale 90.

By making proper adjustments of the nut 107, for each of the positions which the shifting mechanism may take coincidentally with the assumption of such position, a shift may be made accurate in distance and may be completed without jarring the apparatus. It is apparent that for each adjustment of the device to provide a shift of selected length, it is necessary to make an adjustment of the thumb nut 107. So long as length of shift is not disturbed, the adjustment of the part 107 made for a specific shift may remain unaltered.

From the side of the vertically reciprocating carriage 60 opposite that carrying the brake member, friction disks 109 project. These disks are disposed upon an axle 110 extending outwardly from the carriage 60, the disk adjacent the carriage being stationary and carrying a pointer extending over and readable against a scale on the movable disk, which movable disk is integral with the bifurcated bracket member 111 having arms 112 at an obtuse angle.

Projecting from the end to each of the two arms 112 are two track members 113, which at their outer extremities are joined by a cross member 114 having bosses 115 into which the track members project. Any suitable friction means may be employed for securing the track members 113 in said supporting and brace member 114.

Upon the tracks is a carriage 116 comprising cross members 117 and side members 118.

Upon the plate 119 and mounted to permit sliding movement is a tube supporting element 120. At each side of the plate 119 are brackets 121 of insulating material, upon which a tube 122 is secured. Also secured to the plate 119 are means for fastening a bowl of lead glass 123, such bowl being well known in the X-ray art. Through the carriage portion 116 and the slidable plate 119 an aperture is provided for the passage of X-rays.

The adjustments of the X-ray tube 122 and its supporting members permit of it being used upon a patient disposed upon a table. The tube is capable of being moved to any desired point over the patient, who is then photographed from above.

Further adjustment permits of the tube being turned at a right angle to the first-mentioned position for the purpose of photographing a person in standing or sitting position. This is when the cassette changer is employed. This adjustment is particularly useful when a vertical adjustment of the tube 122 is possible in view of the fact that the supporting plate 119 may be swung at an angle in one direction; the tube 122 may be swung upon the carriage plate; the tube itself is adjustable within its holder portions; and the carriage as a whole is angularly adjustable at the friction plates.

The independent operating member for the plate shifter and the independent operating member for the vertical units may be mechanically operated, or they may be operated in combination with the magnetic release in each of the trigger actuating members, the member for operating the plate shifter being substantially identical with that on the tube shifter. The two magnetic releases are adapted to be conjointly operated from a single push button switch.

Such circuit as has been suggested in the last paragraph is found in the conduits 124 and 125, one of said conduits being provided with a switch 126. Such switch may be of any desired form.

The conduits 124 and 125 run to the trigger actuating mechanism 35 upon the plate shifter and to the magnetic release encased in the housing 72, which magnetic release is identical with the trigger actuating mechanism indicated under the numeral 35. The closing of switch 126 thus provides means for concurrently actuating the two trigger releases permitting the plate shifter and the tube shifter to move simultaneously.

What I claim is new and desire to procure by Letters Patent of the United States is:—

1. In a tube shifter, a standard, a tube carrying carriage on said standard, an anchor for said carriage on said standard, connecting means intermediate said carriage and anchor comprising a spring member and a support therefor having means for adjusting the tension upon said spring, and a catch on said anchor for holding said carriage when said spring member is stretched.

2. A tube shifter comprising a standard, a carriage slidably disposed on said standard, a spring member upon said carriage and secured to said standard, a support for said spring member and having means for varying the tension on said spring member, and a catch on said standard for holding said carriage when said spring is stretched.

3. In a tube shifter, a standard, a carriage slidably disposed on said standard, a catch for said carriage adjustably secured to said standard, and connecting means intermediate said carriage and catch, said connecting means comprising a spring member and a support therefor having means for varying the tension of said spring.

4. In a tube shifter, a standard, a carriage slidably disposed on said standard, a catch for said carriage adjustably secured to said standard, and connecting means intermediate said carriage and catch, said connecting means comprising a spring and a member adjustably secured to said carriage, said member having a catch engaging portion at one end and means for its adjustable attachment to said spring at its other end.

5. An X-ray tube shifting mechanism, comprising a standard, a carriage movable on said standard and carrying an X-ray tube, an anchor member upon said standard, a trigger on said anchor member, a trigger engaging member on said carriage and adjustable relatively thereto, and resilient connecting means between said carriage and said anchor member to move said carriage when said trigger is actuated.

6. In an X-ray tube shifter, a standard, an anchor member thereon, a trigger on said anchor member, an X-ray tube carriage movable on said standard, a member on said carriage for engaging said trigger, said member being movable relatively to said carriage, resilient connecting means between said anchor and carriage for moving said carriage when said trigger is actuated, and means for limiting the movement of said carriage, the magnitude of the movement of said carriage being determined by the adjustment of said trigger engaging member and of said limiting means.

7. In an X-ray tube shifting device, a standard, latch means on said standard, a carriage movable on said standard, a telescoping sectional member on said carriage and engaged by said latch means, resilient connecting means between said carriage and said latch means for moving said carriage upon actuation of said latch means, and means for limiting the movement of said carriage, adjustment of said telescopic member relatively to said carriage and adjustment of said limiting means determining the magnitude of the movement of said carriage, and adjustment of the sections of said telescoping member determining the urge of said resilient connecting means.

8. In an X-ray tube shifter, a standard, a latch means on said standard, an X-ray tube carriage having a member adjustable relatively thereto and engaging said latch means, said carriage being movable on said standard, said relatively movable member being engaged by said latch means when said carriage is moved, means for urging said carriage away from said latch means when said latch means is actuated, and means for progressively retarding the movement of said carriage as said carriage moves away from said latch means.

9. In an X-ray tube shifter, a standard, latch means on said standard, an X-ray tube carriage movable on said standard and having a normal position, a member on said carriage and adjustble relatively thereto for engaging said latch means to releasably secure said carriage in an abnormal position, means for urging said carriage to return to its normal position upon actuation of said latch means, and yielding means for arresting movement of said carriage as it approaches its normal position.

10. In an X-ray tube shifter, a standard, latch means on said standard, an X-ray tube carriage movable on said standard and having a normal position relatively to said latch means, a member on said carriage and adjustable relatively thereto for engaging said latch means to releasably lock said carriage after movement to an abnormal position relative to said latch means, means for urging said carriage to return to its normal position upon actuation of said latch means, and brake means for retarding the motion of said carriage under the influence of said urging means and for arresting its movement when said carriage reaches its normal position.

11. An X-ray apparatus comprising a standard, an anchor member on said standard, a latch mechanism on said anchor member, a tube supporting carriage movable on said standard, a member on said carriage and adjustable relatively thereto for releasably engaging said latch mechanism, means interconnecting said anchor member and said adjustable member for urging a shifting movement to said carriage upon release of said latch mechanism from said adjustable member, adjustable brake means for controlling the speed of the shift of the carriage, and cushion means upon said adjustable member on said carriage, the magnitude of the shift of said carriage being determined by adjustment of the adjustable member on said carriage and of said brake means, said cushion means abutting said anchor member to prevent jar incident to the movement of said carriage.

12. In an X-ray apparatus, a standard, an anchor member on said standard, latch mechanism on said anchor member, a tube supporting carriage on said standard, a member on and adjustable relatively to said carriage and releasably engaged by said latch mechanism, means interconnecting said anchor member and said carriage for causing a shifting movement of said carriage upon disengagement of said latch mechanism from said adjustable member, adjustable brake means for controlling the speed of the shift of the carriage, and cushion means concentric of said adjustable member, the magnitude of the carriage shift being fixed by position of the adjustable member on said carriage and by said adjustable brake means, said cushion means abutting said anchor member to prevent jar incident to the completion of the movement of said carriage.

13. In an X-ray apparatus, a standard, an anchor member on said standard, latch mechanism on said anchor member, a tube supporting carriage on said standard, a member adjustable on said carriage and releasably engaged by said latch mechanism, a scale on said carriage, means interconnecting said anchor member and said carriage for causing a shifting movement of said carriage upon disengagement of said latch means from said adjustable member, adjustable brake means for limiting the shift of said carriage, the magnitude of the carriage shift being determined by the position of the adjustable member on said carriage and by said adjustable brake means, and said scale being in complemental relation with said adjustable member and coacting therewith for indicating the magnitude of the movement of said carriage.

14. In an X-ray apparatus, a standard having a scale thereon, a carriage anchor member movable on said standard, latch mechanism on said anchor member, an X-ray carriage on said standard and having a normal position relative to said anchor member and movable from such position to an abnormal position, a member on said carriage releasably engaged by said latch mechanism when the carriage is in an abnormal position and adjustable in said carriage for determining such abnormal position, a pointer in a fixed position upon said carriage, a pointer movable on said carriage, means interconnecting the carriage and said anchor member for causing a shifting movement of said carriage from an abnormal to the normal position upon disengagement of said latch means with said adjustable member, adjustable means for limiting the movement of said carriage, and means in operative connection with said adjustable member for shifting said movable pointer relatively to said scale coincident with an adjustment of said adjustable member, the fixed pointer indicating on said scale the position of said carriage, and the movable pointer indicating on said scale a position halfway between the normal and abnormal positions when the carriage is in an abnormal position.

15. In an X-ray apparatus, a standard having a scale thereon, a carriage anchor member on said standard, latch mechanism on said anchor member, an X-ray carriage having a scale thereon and movable on said standard, said carriage having a normal position on said standard and being movable to an abnormal position thereon, a member on said carriage releasably engaged by said latch mechanism when the carriage is in an abnormal position and being adjustable in said carriage for determining such abnormal position, a pointer in fixed position upon said carriage, two pointers movable on said carriage, means interconnecting the carriage and said anchor member for causing a shifting movement of said carriage from the abnormal to the normal position upon disengagement of said latch mechanism from said adjustable member, adjustable means for limiting the movement of said carriage, and means in operative connection with the said adjustable member for shifting one of said movable pointers along the scale of said standard coincident with an adjustment of said adjustable member, the second of said movable pointers being directly movable with said adjustable member coincident to an adjusting movement of said member, the fixed pointer indicating on the scale of the standard the position of said carriage, the first of said movable pointers indicating on the scale of the standard a position halfway between an abnormal and normal positions when the carriage is in an abnormal position, and the second of said movable pointers indicating on the carriage scale the distance between the abnormal and normal positions.

16. An X-ray apparatus comprising a standard, means secured to said standard and supporting a latching mechanism, a tube supporting carriage movably mounted on said standard, a member adjustably secured to said carriage and provided with means which is removably engaged by said latching mechanism, means interconnecting said member and said first mentioned means for causing a shifting movement of said carriage upon disengagement of said latching mechanism from said second mentioned means, and adjustable means for limiting the carriage shift, the magnitude of the carriage shift being fixed by the adjustment of said member and said last mentioned means.

17. An X-ray apparatus comprising a standard having a scale thereon, anchor means secured to said standard and supporting a latch mechanism, a tube supporting carriage movable on said standard, a pointer on said carriage movable relative thereto and disposed cooperatively with the scale on said standard, a member adjustably secured in said carriage and being releasably engaged by said latch mechanism, means interconnecting said adjustably secured member and said anchor means for causing a shifting movement of said carriage upon disengagement of said latch mechanism from said adjustably secured member, and adjustable brake means for limiting the carriage shift, the magnitude of the shift of said carriage being determined by the adjustment of said adjustably secured member and of the adjustable brake means, said pointer being in operative connection with said adjustably secured member for movement thereby along such scale coincidental with an adjustment of said member, said pointer indicating on the scale on said standard a position halfway between the positions of said carriage before and after such carriage shift.

18. An X-ray apparatus comprising a standard, anchor means on said standard and supporting a latch mechanism, a tube supporting carriage having a scale thereon and being movable on said standard, a member adjustably secured in said carriage and being releasably engaged by said latch mechanism, means interconnecting said adjustable member and said anchor means for causing a shifting movement of said carriage upon disengagement of said latch mechanism from said adjustable member, adjustable brake means for limiting the shift of said carriage, a pointer movable with said adjustable member coincident with an adjustment thereof for indicating upon said scale the magnitude of the carriage shift, the magnitude of the carriage shift being determined by the adjustment of said adjustable member and of said brake means.

19. In an X-ray apparatus, the combination of a standard, anchor member on said standard, latch mechanism on said anchor member, a tube supporting carriage movable on said standard, a member on said carriage and adjustable relatively thereto and releasably engaged by said latch mechanism, means interconnecting said anchor member and said carriage for shifting said carriage upon disengagement of said latch mechanism from said adjustable member, and adjustable brake means comprising a roller on said anchor member and a brake bar on said carriage disposed angularly to the path of movement of said carriage for engaging said roller during the shift of said carriage, the magnitude of the movement of said carriage being determined by the adjustment of said brake means and of the adjustable member in the carriage.

20. An X-ray apparatus comprising a standard, anchor means on said standard and supporting a latch mechanism, a tube supporting carriage movably mounted on said standard and providing means on said carriage and adjustable relatively thereto and removably engaged by said latch mechanism, means interconnecting said carriage and said anchor means for causing a shifting movement of said carriage on disengagement of the latch mechanism from the removably engaged means, and adjustable means for limiting the carriage shift, the magnitude of the carriage shift being fixed by the adjustment of said removably engaged means and said last mentioned means.

21. An X-ray apparatus comprising a standard, means on said standard for the support of a latch mechanism, a latch mechanism on said support, a tube supporting carriage movable on said standard, a member adjustably secured to said carriage and provided with means removably engaged by said latch mechanism, a helical spring interconnecting said adjustable member and said support means on said standard for causing a shifting movement of said carriage upon disengagement of said latch mechanism from the adjustable member, said spring extending in parallelism with the path of movement of said carriage, adjustable brake means for limiting the movement of the carriage, the magnitude of the movement of said carriage being determined by the adjustment of said adjustable member and of said adjustable brake means.

JULIUS B. WANTZ.